US011602937B2

(12) United States Patent
O'Kell et al.

(10) Patent No.: US 11,602,937 B2
(45) Date of Patent: Mar. 14, 2023

(54) PHOTOLUMINESCENT MARKER SYSTEMS (71) Applicant: Saf-T-Glo Limited, Swaffham (GB)

(72) Inventors: Sean Patrick O'Kell, Swaffham (GB); Andrew Jon Hallett, Swaffham (GB)

(73) Assignee: SAF-T-GLO LIMITED, Cwmbran (GB)

( * ) Notice: Subject to any disclaimer, the term of this patent is extended or adjusted under 35 U.S.C. 154(b) by 396 days.

(21) Appl. No.: 16/831,046

(22) Filed: Mar. 26, 2020

(65) Prior Publication Data

US 2020/0308439 A1 Oct. 1, 2020

(30) Foreign Application Priority Data

Mar. 28, 2019 (GB) ...................... 1904351

(51) Int. Cl.
| | |
|---|---|
| *B41J 11/00* | (2006.01) |
| *B60Q 3/46* | (2017.01) |
| *C09D 11/101* | (2014.01) |
| *B41J 3/407* | (2006.01) |
| *C09D 133/08* | (2006.01) |

(Continued)

(52) U.S. Cl.
CPC ......... *B41J 3/407* (2013.01); *B41J 11/00214* (2021.01); *B41M 5/0023* (2013.01); *B60Q 3/46* (2017.02); *C09D 11/03* (2013.01); *C09D 11/101* (2013.01); *C09D 11/50* (2013.01); *C09D 133/08* (2013.01); *G09F 13/20* (2013.01);

(Continued)

(58) Field of Classification Search
CPC ... B41J 3/407; B41J 11/00214; C09D 133/08; C09D 11/101; C09D 5/22; C09D 11/03; C09D 11/50; G09F 13/20; B41M 5/0047; B41M 7/0081; B41M 5/0023; B41M 5/0064; B64D 47/02; B64D 11/00; B64D 2011/0038; B64D 2045/007; B60Q 3/46
See application file for complete search history.

(56) References Cited

U.S. PATENT DOCUMENTS

| | | | |
|---|---|---|---|
| 5,961,072 A | 10/1999 | Bodle | |
| 2013/0199064 A1* | 8/2013 | O'Kell | G09F 13/20 |
| | | | 40/542 |

(Continued)

FOREIGN PATENT DOCUMENTS

| | | |
|---|---|---|
| CN | 1379077 A | 11/2002 |
| CN | 1537660 A | 10/2004 |

(Continued)

OTHER PUBLICATIONS

UKIPO Search Report for GB 2004407.9 dated Sep. 11, 2020 2 pages.

(Continued)

*Primary Examiner* — Yaovi M Ameh
(74) *Attorney, Agent, or Firm* — Foley & Lardner LLP (57) ABSTRACT A method of manufacturing an aircraft photoluminescent marker that comprises a substrate includes providing an ink or coating adapted to be cured with ultra violet (UV) radiation and printing one or more markings directly onto the substrate of the photoluminescent marker with the ink or coating, followed by curing the ink or coating with UV radiation. The substrate is one of a photoluminescent material or a housing, and the marking comprises at least one of a pattern, wording, images, blocks, or indicia.

16 Claims, 2 Drawing Sheets

(51) Int. Cl.
*G09F 13/20* (2006.01)
*B41M 5/00* (2006.01)
*C09D 11/50* (2014.01)
*C09D 11/03* (2014.01)
*B41M 7/00* (2006.01)
*B64D 45/00* (2006.01)
*B64D 11/00* (2006.01)

(52) U.S. Cl.
CPC ......... *B41M 5/0047* (2013.01); *B41M 7/0081* (2013.01); *B64D 2011/0038* (2013.01); *B64D 2045/007* (2013.01)

(56) References Cited

U.S. PATENT DOCUMENTS

| | | | | |
|---|---|---|---|---|
| 2016/0107764 | A1* | 4/2016 | O'Kell | B64D 45/00 116/28 R |
| 2018/0257791 | A1 | 9/2018 | Sutter | |
| 2020/0047665 | A1 | 2/2020 | O'Kell et al. | |

FOREIGN PATENT DOCUMENTS

| | | | | |
|---|---|---|---|---|
| EP | 2 821 240 | | 1/2015 | |
| GB | 2 532 134 | | 5/2016 | |
| GB | 2 551 297 | | 12/2017 | |
| GB | 2 577 177 | | 3/2020 | |
| GB | 2 580 647 | | 7/2020 | |
| JP | 2015193143 | A * | 11/2015 | ............ B32B 27/00 |
| WO | WO-94/17766 | | 8/1994 | |
| WO | WO-96/33093 | | 10/1996 | |
| WO | WO-2018/143965 | | 8/2018 | |

OTHER PUBLICATIONS

Correspondence and Search Report regarding Appl. No. GB 1904351, dated Sep. 23, 2019, 5 pps.
"Correct use of photoluminescent materials", China Academic Journal Electronic Publishing House.
"Printing for packaging material".
Chinese Office Action issued in connection with CN Appl. Ser. No. 202010227930.6 dated Nov. 28, 2022 (7 pages).

* cited by examiner

PHOTOLUMINESCENT MARKER SYSTEMS

CROSS-REFERENCE TO RELATED PATENT APPLICATIONS

This application claims the benefit of and priority to United Kingdom Patent Application No. 1904351.2, filed Mar. 28, 2019, the entire disclosure of which, including the specification, drawings, claims, and abstract, is incorporated herein by reference in its entirety.

BACKGROUND

This application relates to an improved photoluminescent marker and an improved method of manufacturing photoluminescent markers.

In commercial aircraft emergency way guidance may be provided identifying routes to an exit and exit markers. In addition markers may be used to identify portions of the aircraft cabin or furniture. Routes that lead from passenger seating to emergency exits are conventionally indicated by emergency path markers provided on the floor of the aircraft cabin. Typically the emergency path markers are located in an aisle area of an aircraft cabin. The emergency path markers may be provided in the form of strips extending along one or both sides of the aisle.

Emergency exits may be marked by exit sign markers. In order to facilitate safe evacuation of the aircraft cabin in the case of an emergency it is necessary that the emergency exit markers are visible in darkness.

Additionally it is desirable in some cases to provide markers in other locations in the aircraft cabin. It may be desirable that such markers are visible in darkness or in low light levels.

In order for a photoluminescent marker to be used as a safety marker system the system has to meet a number of requirements and it is necessary that the guidance material demonstrates compliance with CS/FAR 25 (Certification standards for large aircraft) when using photoluminescent materials for the emergency evacuation guidance systems. Typically a system may be tested by carrying out a naive evacuation in a worst case aircraft and system. The naive evacuation testing is generally accepted as substantiation for both single and twin aisle approvals. All photoluminescent material performance testing for further new approvals is then performed by comparison with the performance of the material used for the naive test. The materials used for the naive test can be used as a limit sample. The limit sample may use a "worst case" arrangement of materials and markers. Further materials can be approved if it can be shown that the performance characteristics are better than the limit sample and retesting is not required.

In tests of emergency evacuation systems there are two scenarios which are considered. In the first scenario an emergency is considered to occur on the runway during taxiing or take-off A second scenario is considered to be after a night flight when passengers have been sleeping in the dark. In such a circumstance the human eye is considered to be dark adapted. In both scenarios a cabin of the aircraft may be considered to have been filled with smoke.

Typically a photoluminescent material absorbs energy from light in a particular range of wavelengths of the electromagnetic spectrum. The energy of the wavelengths excites electrons from ions in a lattice to a higher energy level. In a photoluminescent material the electrons typically may lose some energy to other ions in the lattice. The electrons may then move to a metastable state in which the electrons may remain for a period of time. Thermal energy absorbed from the lattice may after a period of time can cause the electrons to move from the metastable state to a ground state and to emit light at a wavelength longer than that of the excitation energy.

The marker may include a cover provided over at least a top or outer surface of the photoluminescent material. The cover may be provided to protect the photoluminescent material from wear, chemical attack, abrasion etc.

In some cases the photoluminescent markers may be provided in a simple form in which the photoluminescent material is perceived to have a yellow/green color in ambient lighting and the emission color is typically green. It may be desirable to change the perceived color of the photoluminescent markers in ambient lighting. In many cases it has been considered to be desirable to change the perceived color of the photoluminescent markers in ambient lighting conditions such that the photoluminescent markers blend in with the color of the surface on which the marker is mounted or supported. This may be particularly desirable in the case of photoluminescent markers utilized as emergency path route markers in the aisle of an aircraft. It is desirable that such aisle route markers are not obvious and intrusive in normal conditions, but that the aisle route markers are clearly obvious in the case of low light levels in an emergency situation in which the passengers have to rely on the emergency path route markers for guidance.

Typically marker systems have been provided in which the photoluminescent material is provided on a base or support and having a protective cover. In order to change the appearance of emergency path markers in ambient light it has typically been necessary to print a color or pattern on a film and for the film to be attached to the photoluminescent material or secured adjacent to the photoluminescent material on the support or within the cover. The film and photoluminescent material may be inserted in a housing which can be secured, for example, to the floor of the cabin. It will be appreciated that the film has to be handled carefully or the film may be crumpled or distorted as the film and the photoluminescent material are inserted into the cover. In some cases the photoluminescent material and the film may be laminated together and secured within a housing or to a cover. Typically the photoluminescent material comprises a rigid or semi-rigid material. The photoluminescent material may comprise a semi-rigid insert.

In some examples a color or pattern may be printed directly on the photoluminescent material in order to alter the perceived color of the photoluminescent material in ambient lighting conditions. Printing on photoluminescent material has been carried out by means of screen printing on the photoluminescent material. Screen printing limited the size of a printed area. Practically it is difficult to print images which have a printing area of greater than 1 m.

Typically the photoluminescent material comprises a photoluminescent pigment dispersed in a resin. The photoluminescent pigment is typically not water stable. It has been found to be necessary to disperse the photoluminescent pigment in a resin in order to stabilize the pigment for use in a marker systems. It has been found that printing on the resin is difficult. In some cases it has been found to be possible with solvent screen printing but as noted above this method is limited and the solvent inks are not durable and are susceptible to damage.

Often a photoluminescent marker may comprise photoluminescent material in a housing or provided with a cover. As aircraft escape guidance markers are typically located on a floor of an aircraft cabin the markers are susceptible to damage by foot traffic on the marker. The cover or housing may comprise a polycarbonate cover. It has been found that a durability of the polycarbonate cover can be enhanced by the application of a protective coating. Typically the coating may be a methyl methacrylate. It has been found that printing on the coating used to enhance the durability of the cover is particularly difficult.

There is a need for an improved method of changing the perceived color of the photoluminescent material of an aircraft photoluminescent marker in ambient light.

SUMMARY

One embodiment relates to a method of manufacturing an aircraft photoluminescent marker that comprises a substrate, the method including providing an ink or coating adapted to be cured with ultra violet (UV) radiation and printing one or more markings directly onto the substrate of the photoluminescent marker with the ink or coating, followed by curing the ink or coating with UV radiation. The substrate is one of a photoluminescent material or a housing, and the marking comprises at least one of a pattern, wording, images, blocks, or indicia.

Another embodiment relates to an aircraft photoluminescent marker that comprises a substrate and is manufactured in accordance with a method that includes providing an ink or coating adapted to be cured with ultra violet (UV) radiation and printing one or more markings directly onto the substrate of the photoluminescent marker with the ink or coating, followed by curing the ink or coating with UV radiation. The substrate is one of a photoluminescent material or a housing, and the marking comprises at least one of a pattern, wording, images, blocks, or indicia.

Another embodiment relates to an aircraft photoluminescent marker that includes a substrate and a layer comprising an ink or coating marking printed directly onto the substrate. The ink or coating is a composition cured by UV radiation, and the marking is at least one of a pattern, words, images, blocks, or indicia.

Another embodiment relates to an aircraft emergency lighting system that includes at least one photoluminescent marker, each photoluminescent marker including a housing and an insert. The housing is adapted to cover the insert, the insert including photoluminescent material arranged to be charged through the portion of the housing covering the insert and the housing further including a coating, wherein the coating comprises a UV curable coating.

BRIEF DESCRIPTION OF THE DRAWINGS

The invention will now be further described, by way of example only, with reference to the accompanying Figures in which.

DETAILED DESCRIPTION

According to an exemplary embodiment, there is provided a method of manufacturing a photoluminescent marker adapted for use in an aircraft, the method comprising printing one or more markings on photoluminescent material, the markings comprising an ink or coating adapted to be cured with ultra violet (UV) radiation wherein the marking comprises a pattern, wording, images, blocks or indicia and wherein the cured ink or coating is flexible and is printed directly onto the photoluminescent material comprising a flexible substrate or wherein the ink or coating is printed directly onto a flexible housing.

According to an exemplary embodiment, there is provided a method of manufacturing an aircraft photoluminescent marker, wherein a photoluminescent marker is provided comprising at least a substrate, the method comprising:

i) providing an ink or coating adapted to be cured with ultra violet (UV) radiation;

ii) printing one or more markings directly onto the substrate of the photoluminescent marker with the ink or coating;

iii) wherein the marking comprises a pattern, wording, images, blocks or indicia;

iv) wherein the substrate is one of a photoluminescent material and a housing; and v) curing the ink or coating with UV radiation.

In a preferred embodiment the cured ink or coating is flexible. A degree of flexibility in the cured ink or coating is discussed further below.

In one embodiment the photoluminescent material is flexible. A flexible photoluminescent material is described in our co-pending UK application number GB1911253.1, (published as GB 2 577 177), the contents of which are incorporated by reference in their entirety.

In another embodiment the housing is flexible. In some embodiments both the housing and the photoluminescent material are flexible. The photoluminescent material or the housing may be arranged to be flexible such that it is bendable to a radius of from 0.1 m to 1.0 m. The cured ink or coating may be arranged to be sufficiently flexible that it can bend and flex in such a manner without cracking or distorting.

The markings comprise a pattern, wording, images, blocks or indicia. The blocks may be colored blocks.

The markings may be applied to the photoluminescent marker in order to change a perceived appearance of the photoluminescent marker in ambient light or in an emergency scenario.

Typically prior art solutions required the markings to be printed on a film provided in the housing. In some prior art solutions the film is provided as a composite with the photoluminescent material or in other prior art solutions may be provided in or on the housing above the photoluminescent material.

In prior art solutions it was considered to be undesirable or impossible to print directly onto the photoluminescent material or the housing. In particular it has been found that the resin in which the photoluminescent pigment is dispersed cannot be printed on. Typically a housing is provided with a protective coating on an outside of the housing. It has also been found that it is not possible to print on the protective coating. In prior art markers it has been necessary to print onto a film and to place the printed film on the photoluminescent material or in or on housing.

In accordance with some embodiments, the coating or ink is printed directly onto the photoluminescent material. A particular advantage is that the pattern or logo or other marking can be printed directly onto the photoluminescent material and that there is no need for an additional component such as a film. It will be appreciated that removal of a component from the assembly of the final marker reduces cost and complexity in the manufacturing method. It will also be appreciated that the removal of a component from the assembly of the final marker is particularly important in the manufacture of aircraft markers as aircraft components are particularly sensitive to weight. For example removal of a component from an escape marking system can reduce an overall weight from an aircraft system.

It is particularly desirable to be able to print a pattern directly onto the photoluminescent material in order to match an ambient light appearance of the photoluminescent marker with an appearance of a surrounding area on which the photoluminescent marker is mounted. It may be desirable to change the perceived appearance of the photoluminescent material in ambient light in order to make the safety features of the photoluminescent material less intrusive. An advantage of the method of manufacture is that the photoluminescent material may be inserted into a housing. The photoluminescent material may be provided as an insert comprising a base and the photoluminescent material. The insert may be arranged to comprise a single piece insert instead of a base and photoluminescent material and a film. It will be appreciated that a single piece insert provides for easier manufacture and installation into an aircraft.

Printing directly onto a surface of the photoluminescent material has provided unexpected advantages in enabling a much wider range of daylight color options and patterns compared to prior art solutions. Typically photoluminescent material comprises photoluminescent pigment in a resin or polyurethane. Unexpectedly it has been found that the inks and coatings that can be cured with UV light can be printed directly onto the resin of the photoluminescent material. Once cured by the UV light the ink or coating is durable and flexible. The skilled person will be aware that in some embodiments the surface of the photoluminescent material can be hard and abrasive from the particles of photoluminescent pigment. It will also be appreciated that it has been considered to be difficult to apply inks and pigments directly to the photoluminescent material particularly if the particle size in the photoluminescent pigment is relatively large. The photoluminescent pigment can have a brighter output and be longer lasting if the pigment particle sizes are larger. However this has been found to increase the difficulty of screen printing on the photoluminescent material with prior art solutions. Unexpectedly it has been found that the ink or coating can be printed directly onto the photoluminescent pigment providing a durable coating even over large particle sizes in the photoluminescent material.

Unexpectedly it has been found that the inks and coatings that can be cured with UV light can be printed directly onto the protective coating applied onto an outer side of a housing over the photoluminescent material. The inks or coatings may apply a colored or textured pattern onto an outer surface of the housing.

Unexpectedly it has been found that the inks and coatings can be applied to the photoluminescent material and to the housing. Use of UV curing inks and coatings has enabled new combinations and products to be developed.

For example in accordance with one exemplary embodiment, it is possible to provide a printed layer that extends from a first side edge to a second side edge of the marker.

In prior art solutions a printed film was typically applied as a film over or on the photoluminescent material. Consequently once the photoluminescent material is inserted into the housing there is a portion of the marker along either side of the marker that does not have a pattern.

An unexpected advantage of the concepts described herein is that the UV printing can be applied to both the photoluminescent material and to the material of the housing. Therefore it is possible to apply a pattern or color that extends from the first edge of the marker to the second edge of the marker.

Another unexpected advantage is that surface need not be flat. It has been found that it is possible to print onto a curved surface. A marker may be considered to have a width X, a length Y and a height Z. The surface may be curved in a transverse direction to a length of the marker (in a XZ plane). The surface may be curved or rolled in a longitudinal direction to the length of the marker such that the curvature can be considered to be in the YZ plane. In some embodiments the surface may be arranged to curve in an XY plane such that an upper face of the marker is arranged to be flat in terms of height but to curve from side to side.

In some embodiments the pattern may be arranged to match the ambient light appearance of the photoluminescent marker with an appearance of a carpet on which the photoluminescent marker is mounted. In other embodiments the photoluminescent marker may be arranged to match the ambient light appearance of the surrounding surface such as a cabin wall surface or part of a chair or storage bin. It will be appreciated that edge to edge printing of a pattern or color is desirable in matching or contrasting with the appearance of the carpet or other surrounding surface and providing an aesthetically pleasing appearance.

The printing may be carried out by means of a printer adapted to print markings with ink or coating adapted to be cured with UV radiation. The printer may be adapted to print the ink or coating with ink jet technology. The printer may be arranged to cure the coating or ink in situ after printing or coating the photoluminescent material.

It has been found that the use of an ink or coating that is adapted to be cured by UV radiation is particularly advantageous and enables printing a color or pattern directly onto the photoluminescent material. Further the ink or coating has been found to be more durable. The durability of UV cured inks of coating has been found to be significantly greater than that of solvent inks.

Previously it has been considered that solvent inks must be used to print on photoluminescent materials or on films to be used with photoluminescent materials. Such solvent inks are considered to have a low durability and are quite delicate. It has long been known that a solvent inks can be damaged, such as by removal or smearing, simply by contact with a finger. Consequently, prior art markers comprising a photoluminescent material or film printed with solvent inks had to provide a housing or protective coating over the printed layer.

In contrast UV cured inks and coatings have been found to be very durable and to have increased abrasion resistance. The increased durability and abrasion resistance has enabled design of products that do not require protective layers so reducing the number of components and reducing weight and complexity in a product. The skilled person will appreciate that weight reduction is very important in aircraft markers in an aircraft. The markers may be used in aircraft signage markers or in aircraft escape route markers.

It has also been found that it is possible to print protective layers onto a marker rather than having to provide an additional protective component. In some embodiments a protective layer may be colored. In some embodiments a protective layer may be textured. In some embodiments a protective layer may be both colored and textured.

In other embodiments the ink or coating is applied to the housing. It has been found that a pattern can be printed onto a base of the housing or other part of the marker. It has also been found that information such as part numbers and batch numbers can be printed onto a base of the photoluminescent marker.

Such information important to crash investigation teams in the event of an accident as it is critical to be able to identify parts and batch numbers. The ink or coating is extremely difficult to remove from the housing and so the information is securely and permanently provided as a part of the marker.

In a preferred embodiment the printer may comprise light emitting diode (LED) radiation sources. The printer may comprise LEDs arranged to emit radiation in the UV region of electromagnetic radiation. UV curing is a photochemical process wherein UV light cures or dries inks or coatings. The UV radiation may be a high intensity emission from the LEDs.

It has been found that UV curing allows increased productivity and quality as well as performance. UV curing utilizes a photochemical reaction. Liquid monomers and oligomers are mixed with photo-initiators which are then exposed to UV radiation. The markings may be arranged to harden when exposed to UV radiation.

In some embodiments the photoluminescent material comprises a flexible substrate. In some embodiments the substrate may be roll fed to the printer. Desirably colors or patterns may be applied to the photoluminescent material in long sections such that there are no breaks or such that breaks in the pattern are greatly reduced. It has been found that the speed of production of the finished product is greatly improved. In some embodiments the photoluminescent substrate may be roll fed to the printer. In some embodiments the printed and cured photoluminescent marker may be rolled as the photoluminescent marker exits the printer. It may be desirable to store the photoluminescent marker in a rolled condition prior to installation in an aircraft. The roll of photoluminescent marker may be arranged to have a radius of from 0.1 m to 1.0 m. Preferably the coating flexes with photoluminescent marker and does not crack or split.

The method of manufacture of the photoluminescent markers in accordance with one exemplary embodiment has a particular advantage in being adapted to print directly onto photoluminescent material on a flexible substrate such as a substrate adapted to be rolled up for storage. Conventionally it has only been possible to apply a marking to photoluminescent material by means of screen printing or by means of solvent based digital printing. As discussed screen printing can limit the size of the printed area. Additionally it has been found that screen printing is not effective for bespoke designs and is time consuming to set up and carry out. It has been found that there are disadvantages to the use of solvent based digital printing. The printed area requires a period of time for drying, during which leaching into the photoluminescent material can occur. Additionally it has been found that the inks used in solvent ink printing are not durable and are prone to being wiped off the photoluminescent material in use. It has been found that solvent based pigments are prone to cracking if exposed to any flexing or to expansion or contraction under pressure or temperature variations. Screen printing is time consuming to set up the process. Screen printing requires careful and time consuming drying of the printed markings. Screen printed markings may also be vulnerable to fading in use.

In some embodiments the substrate may comprise a vinyl substrate. The vinyl substrate may be flexible or may be at least partially rigid. In some embodiments the vinyl substrate may be laminated to increase the rigidity.

In other embodiments the substrate may comprise a rigid substrate. In some embodiments the substrate of the photoluminescent material may comprise a curved surface or a curved edge. The curvature may be in any of the planes described above.

In accordance with another exemplary embodiment, there is provided a photoluminescent marker manufactured in accordance with the first aspect of the invention.

In accordance with another exemplary embodiment, there is provided an aircraft photoluminescent marker comprising a substrate and a layer comprising an ink or coating printed directly onto the substrate, wherein the substrate is one of a photoluminescent material and a housing and wherein the ink or coating is a composition cured by UV radiation.

In some embodiments the photoluminescent marker is printed with an ink or coating wherein the ink or coating comprises an acrylic resin. Preferably the coating or ink is adapted to be cured with UV radiation and cures or dries very quickly. Curing may be in a matter of seconds. It will be appreciated that this is much faster than alternative methods in which the coating or ink is dried with heat or in the air over a number of hours. Desirably the ink or coating is arranged to cure in a few minutes. Typically curing may be from less than 1 sec to 1 minutes or more preferably from 0.1 sec to 1 minutes or from 0.5 secs to 1 minutes A particular advantage of curing the coating or ink with UV radiation is that the coating or ink cures rapidly. This is advantageous in terms of managing work flow. Another advantage is that drying occurs before there is any leach of the inks onto the photoluminescent material. Accordingly it is possible to control the color or pattern more closely. It has been found that an advantage of the rapid curing of the coating is that the ink does not leach into the photoluminescent material. It has been found that high resolution images can be formed in the coating.

It has also been found that a range of colors available is greatly increased. The use of an inkjet printing technology provides a range of color and hue as ink jet technology provides a wide range of colors created from a mix of a number of basic ink colors. In contrast in the prior art the ink is applied as a solvent onto a film and the range of colors available is limited by the use of the film.

In some embodiments the coating or ink may comprise an optically clear acrylic resin. Preferably the resin is optically clear in the range of from 250 nm to 1000 nm or more preferably from 300 nm to 600 nm or from 400-600 nm. It is desirable that the resin is transparent or substantially transparent to electromagnetic radiation in this range of wavelengths in order to allow charging of the photoluminescent material and to allow transmission of the light emitted from the photoluminescent material. The photoluminescent material may be charged by electromagnetic radiation in the range of from 300 to 550 nm or from 300 to 500 nm. The light emitted from the photoluminescent material may be from 400 to 600 nm or more preferably from 450 to 550 nm.

Desirably the coating or ink is flexible. In a preferred embodiment the coating or ink is stretchable and may be arranged to flex, stretch, or roll without cracking. An advantage of the use of coatings and inks adapted to stretch is that the coatings or inks may be used on substrates that are arranged to be rolled up in storage or prior to application to a surface in an aircraft or that may be utilized in situations where a surface on which the marker is mounted in use is not flat. The photoluminescent markers are advantageously adapted to be used on curved surfaces. The markers may be used on a convex curved surface or a concave curved surface or a combination of the two.

In a particularly preferred embodiment the coating or ink may be applied to a photoluminescent material on a flexible substrate. In a particularly desirable embodiment the coating or ink may be applied to photoluminescent material on a flexible substrate and the photoluminescent marker may be arranged to be rolled up prior to installation. It will be appreciated that a coating or ink that does not crack is particularly advantageous.

Desirably the photoluminescent material is arranged to be flexible.

In one embodiment the coating or ink is applied directly the surface of a photoluminescent material. The photoluminescent material may comprise photoluminescent particles dispersed in a resin. The resin may be an epoxy based resin. Preferably the epoxy based resin is flexible. The resin may be coated onto a flame retardant substrate.

Other resins may be utilized such as thermoplastic polyurethane (TPU), Thermoplastic elastomers (TPE), polyethylene terephthalate (PET), polypropylene (PP), polyethylene (PE) amongst others.

In some embodiments the ink or coating may be applied to a flexible photoluminescent material supported on a flexible substrate. A photoluminescent marker may comprise a substrate and photoluminescent material on the substrate and a coating or ink on the photoluminescent material. In some embodiments the photoluminescent marker may be stored in a roll prior to installation. In other embodiments the photoluminescent marker may be applied to a curved surface in use. It will be appreciated that a rolled photoluminescent marker may be readily installed in an aisle of an aircraft by unrolling the photoluminescent marker and cutting the marker to length. In some embodiments the photoluminescent marker may be provided in a housing and the housing may be flexible. In other embodiments the photoluminescent marker is flexible and the housing is semi rigid or rigid. It has been found that the use of one piece inserts of photoluminescent marker reduces the installation time significantly, particularly the preparation time pre installation. In some cases it has been found that the reduction in preparation time may be as much as 80% of the allotted time for preparing for installation of the photoluminescent marker system. As such the installation time in the aircraft may only be 20% of the time previously allotted.

It will be appreciated that in some applications the marker may be applied to a curved surface in the aircraft, particularly for photoluminescent markers utilized for identification of the exit doors or other parts of the aircraft.

Application of a photoluminescent marker to a curved surface, in particular a convexly curved surface will impose a degree of stretching on the substrate and the coating or ink. Preferably the coating or ink is able to stretch sufficiently that the coating does not crack in use. In a preferred embodiment the coating or ink is able to stretch such that the photoluminescent material on a substrate can be rolled up prior to installation without cracking the coating or ink. It will further be appreciated that a degree of stretching is advantageous in that the coating or ink may be used on a photoluminescent marker that may stretch or compress in use in an aircraft under pressure or temperature variations. This can be particularly marked in the case of long lengths of photoluminescent markers use in marking out emergency paths along an aisle.

An advantage of the concepts described herein is that the coating or ink may be more durable than conventional coatings.

Unexpectedly it has been found that the light transmission properties of the inks and coating that are UV curable are particularly suited for use in combination with photoluminescent material allowing the photoluminescent emission to be transmitted and also allowing electromagnetic radiation to pass through to charge the photoluminescent pigments effectively.

A further problem that has been encountered with solvent based digital printing of markings is that the markings are not durable. On certain substrates markings that are applied with a solvent based pigment have been found to be lacking in durability and may be wiped or removed or damaged due to abrasive forces in the course of normal use if there is direct contact with the solvent based digital printed markings. It is therefore undesirable to use photoluminescent markers in situations where they can be touched by a passenger or crew member in the course of normal use of the photoluminescent marker in an aircraft.

Advantageously the coatings or inks utilized in accordance with the exemplary embodiments described herein are resistant to abrasive forces. Desirably the coatings or inks are adapted to be used in environments where the marker may be handled or touched in the course of normal use.

The coating or ink may have a gloss finish or a matte finish. In some embodiments the coating or ink may have an anti-glare finish. In some embodiments the coating or ink may have a patterned finish.

In accordance with another exemplary embodiment, there is provided an emergency lighting system comprises one or more photoluminescent markers in accordance the second aspect of the invention.

In a preferred embodiment the photoluminescent marker further comprises a housing. Preferably the photoluminescent material is provided on a substrate. The photoluminescent material and the substrate may form an insert adapted to be inserted into the housing.

In accordance with another exemplary embodiment, there is provided an aircraft comprising an emergency lighting system in accordance with the third aspect of the invention.

In accordance with another exemplary embodiment, there is provided a method of installation of an emergency lighting system that includes installing at least one photoluminescent marker in accordance with the second aspect of the invention in an aircraft.

In accordance with another exemplary embodiment, there is provided an emergency lighting system adapted to be installed in an aircraft in use and comprising at least one photoluminescent marker, each photoluminescent marker comprising a housing and an insert, the housing being adapted to cover the insert, the insert comprising photoluminescent material arranged to be charged through the portion of the housing covering the insert and the housing further comprising a coating wherein the coating comprises a UV curable coating.

The housing may comprise a polycarbonate or thermoplastic urethane (TPU), an acrylic or a glass or other suitable material.

In some embodiments the coating comprises a protective finish. In some embodiments the coating may comprise a patterned finish. The coating may have a gloss finish or may have a matt or semi-matte finish. In other embodiments the coating may comprises an antiglare finish. In some embodiments the coating may be colored or at least partially colored.

The protective finish may be arranged to provide resistance to chemicals or to abrasion. Resistance to abrasion may provide additional protection in use as a floor marker where the marker is exposed to footfall and the passage of food and drink trolleys.

Use of a UV cured coating has been found to allow the provision of different finishes in contrast to previous methods in which any protective coating had to be sprayed onto the housing. The UV coating may comprise a pattern or a logo.

Other aspects of the various embodiments described herein are set out in the claims appended hereto.

Figure 1:
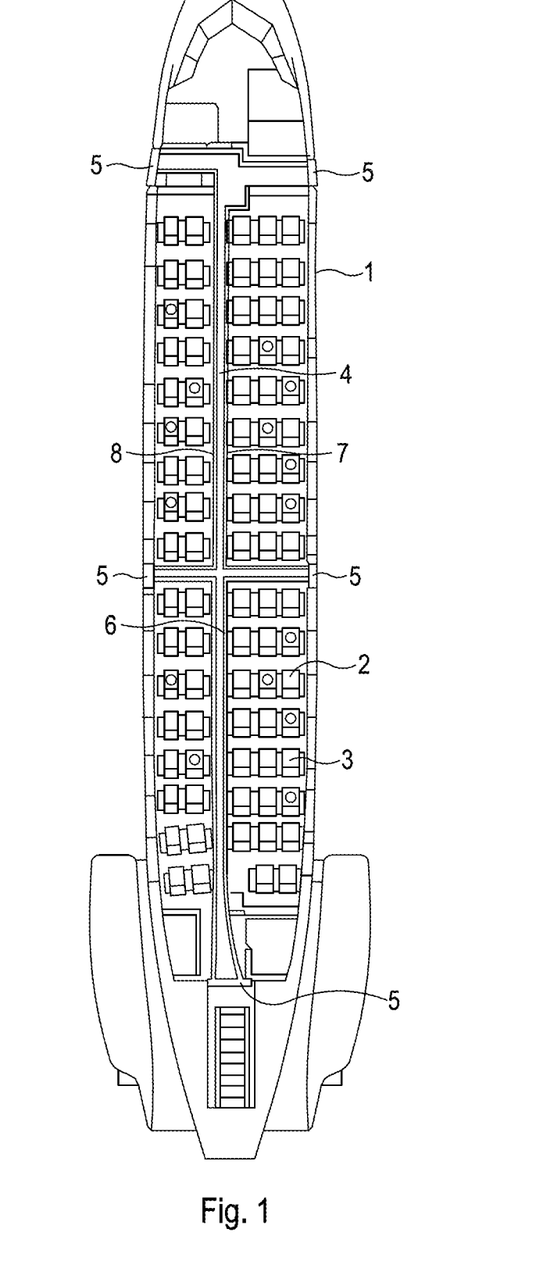
FIG. 1 is a schematic view of an aircraft comprising a photoluminescent marker system in accordance with an exemplary embodiment.

FIG. 1 is a schematic diagram of an aircraft comprising an emergency evacuation lighting system. A typical arrangement of the interior of a cabin 1 of a passenger aircraft is shown. Seats 2 are arranged in rows 3 on opposite side of a central aisle 4. In this embodiment five seats are shown in each row 3 arranged in groups of two on one side of the central aisle 4 and in groups of three on the opposite side of the central aisle 4. This is not essential however and it will be understood that the number and arrangement of seats 2 in each row 3 may be varied while providing a central aisle 4 separating groups of seats 2 in each row 3 for access in the direction of the length of the cabin 1. It will further be appreciated that a single central aisle may be provided or a twin aisle may be provided.

Exits 5 are provided at the front and rear of the cabin 1 for passengers to get on and off the aircraft both in normal use and in an emergency. Additional exits 5 are provided midway along the central aisle 4, usually opening over the wings (not shown) for use in an emergency.

In an emergency, for example following a crash landing or aborted take-off, the ceiling lighting system may be inoperable due to impact damage to the structure of the aircraft. To assist in evacuation of the aircraft in the event that the normal overhead electrical lighting system fails or is blocked by smoke, a floor mounted emergency lighting system 6 is provided. The emergency lighting system 6 emits visible light photoluminescent to identify an escape route at floor level extension along the central aisle 4 between the seats 2 to the exits 5. The emergency lighting system typically comprises two similar tracks 7, 8, arranged on opposite sides of the central aisle 4 adjacent to the rows of the seats.

Emergency way path markers are provided on either side of the aisle. Further photoluminescent markers are provided to identify the exits. Additionally photoluminescent markers can be provided to identify seat numbers or the location of power sockets or other parts of the aircraft furniture.

Figure 2:
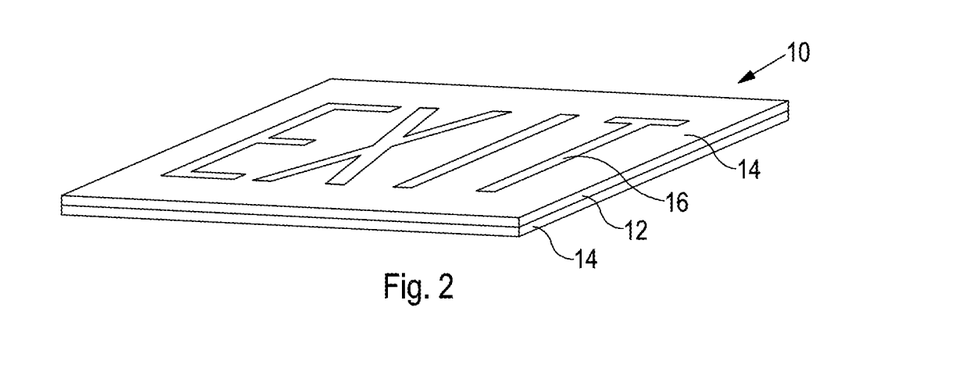
FIG. 2 is a perspective view of a photoluminescent marker in accordance with an exemplary embodiment.

A photoluminescent marker in accordance with an exemplary embodiment is illustrated in FIG. 2, with the photoluminescent marker 10 comprising photoluminescent material 12 provided on a substrate 14 and further comprising one or more markings 16 on the photoluminescent material, the markings comprising an ink or coating adapted to be cured with ultra violet (UV) radiation.

In this embodiment the substrate comprises a flexible substrate. It will be appreciated that the substrate may be a rigid substrate. A flexible substrate is described in more detail in our co-pending application number GB2577177, the full contents of which are incorporated by reference herein. The photoluminescent material is applied to the flexible substrate. In some embodiments the substrate may comprise a vinyl substrate. In one embodiment the photoluminescent marker is arranged to be rolled up prior to installation in an aircraft cabin. The substrate with the photoluminescent material thereon is arranged to be roll fed to a printer. The printer is arranged to print a coating or an ink or a combination of a coating and an ink onto the photoluminescent material provided on the flexible substrate. The flexible substrate is a flame retardant substrate. The substrate may be a vinyl or thermoplastic polybutylene, PET TPU, PEGT, polycarbonate. The substrate may have a protective coating applied on an outer surface. In some embodiments the printed and cured photoluminescent marker is rolled as the photoluminescent marker exits the printer. It may be desirable to store the photoluminescent marker in a rolled condition prior to installation.

The photoluminescent material comprises photoluminescent particles dispersed in a resin. The resin in a preferred embodiment is an epoxy based resin. The epoxy based resin is flexible. It will be appreciated that other resins may be utilized such as thermoplastic polyurethane (TPU), thermoplastic elastomers (TPE), polyethylene terephthalate (PET), polypropylene (PP), polyethylene (PE) amongst others.

The printer is arranged to apply a coating or an ink to the photoluminescent material. The photoluminescent material may be introduced to the printer already on the substrate. The printer comprises a UV printer arranged to apply a coating or an ink onto the photoluminescent material. The printer may be a conventional printer adapted to print with inks or coatings that are adapted to be cured by UV radiation. Accordingly the printer will not be described in more detail here. In a preferred embodiment the printer is adapted to print the ink or coating with ink jet technology. The UV radiation is emitted by light emitting diodes (LEDs).

The coating or ink is arranged to be applied directly to the surface of the photoluminescent material. In other embodiments the coating or ink is applied to an outer surface of the housing. Typically the outer surface of the housing may have a protective coating.

The markings may comprise a pattern, wording, images, block color or indicia and these are arranged to be printed directly onto the photoluminescent material. The photoluminescent material is in the form of photoluminescent pigments/particles dispersed in an epoxy based resin.

A particular advantage is that the pattern or logo or other marking can be printed directly onto the photoluminescent material and that there is no need for an additional component such as a film or other element comprising a pattern to be provided and secured in place relative to the photoluminescent material and a protective housing.

It will be appreciated that printing of a pattern directly on the photoluminescent material which is roll fed into the printer allows for greater speed and efficiency in printing. Accordingly it has been found that the manufacture and assembly time has been reduced significantly. The printer can be arranged to produce a length of printed photoluminescent material. In this way a photoluminescent marker is obtained on which the pattern extends for a length that is greater than was previously possible.

The pattern may be arranged to be printed directly on the photoluminescent material in order to match an ambient light appearance of the photoluminescent marker with an ambient light appearance of a carpet on which or adjacent to which the photoluminescent marker is mounted in use in an aircraft cabin. It will be appreciated that it may be desirable to provide other appearances for the photoluminescent material in ambient light in order to make the safety features of the photoluminescent material less intrusive in other locations and that the photoluminescent material may be printed with coatings or inks that are arranged to blend or complement other surroundings in an aircraft cabin.

In some applications of the photoluminescent marker, the photoluminescent material is provided on a support and is formed into an insert 18. In this embodiment the support comprises a base. The insert 18 is arranged to be inserted in a housing 20. The pattern is printed directly onto the photoluminescent material provided on the base. The insert 18 is arranged to comprise a single piece insert instead of a base and photoluminescent material and a film. It will be appreciated that a single piece insert 18 is more easily manufactured and installed in an aircraft.

It has been found that the use of an ink or coating that is adapted to be cured by UV radiation is particularly advantageous and enables printing a color or pattern directly onto the photoluminescent material. Additionally the ink or coating has been found to be more durable.

A particular advantage of the method of manufacture is that the ink or coating is printed onto photoluminescent material and the photoluminescent material can be provided on a flexible substrate. Photoluminescent material provided on a flexible substrate and adapted to be rolled has particular characteristics in the form of particular photoluminescent particle size distributions. Typically the photoluminescent particles are dispersed in a flexible resin. D50 is the mass median diameter or (MMD). D-values (D10, D50 and D90) are the intercepts for 10%, 50% and 90% of the cumulative mass. The size of D50 is in the range from 10-100 µm. In one embodiment D90 values may be as much as 200 µm. Methods of measuring D50 and D90 are conventional and include laser diffraction or electron microscopy.

Another advantage of the method of manufacture is that the ink or coating is not a solvent based ink or coating and therefore the solvents utilized in the process are significantly reduced which also reduces the environmental impact of the method of manufacture of the photoluminescent markers.

In other embodiments the substrate may comprise a rigid substrate. It has also been found that the substrate can comprise a curved surface. The surface may be curved in the XY, XZ or YZ plane depending on the application. The surface may be convex or may be concave. The marker may be curved in a horizontal plane.

In some embodiments the ink or coating comprises an acrylic resin. Typically the ink or coating is arranged to cure in a few minutes. Typically curing of the ink or coating is completed in less than a minute and in one embodiment in a second or less. The curing time for printing of the colors and patterns onto the photoluminescent material is greatly reduced so increasing productivity and enabling the provision of bespoke printing patterns and products. It will be appreciated that this is much faster than alternative methods in which the coating or ink is dried with heat or in the air over a number of hours. The rapid curing of the ink or coating is advantageous in terms of managing work flow. Another advantage is that curing occurs before inks can leach from the coating or ink into the photoluminescent material. The inks used in printing and curing with UV have a greatly increased range of colors and use of an inkjet printing technology provides a greater range of color and hue than was possible with screen printing.

In some embodiments the coating or ink may comprise an optically clear acrylic resin. The resin is arranged to be optically clear in the range of from 400-600 nm. It is desirable that the resin is transparent or substantially transparent to electromagnetic radiation in these wavelengths in order to allow charging of the photoluminescent material and to allow transmission of the light emitted from the photoluminescent material. The photoluminescent material may be charged by electromagnetic radiation in the range of from 300 to 550 nm or from 300 to 500 nm. The light emitted from the photoluminescent material may be from 400 to 600 nm or more preferably from 450 to 550 nm.

The coating or ink is flexible. In a preferred embodiment the coating or ink is stretchable and may be arranged to flex, stretch, or roll without cracking. The use of coatings and inks adapted to stretch is such that the coatings or inks may be used on substrates that are arranged to be rolled up in storage or prior to installation or that may be utilized in situations where the surface on which the marker is mounted in use is not flat. It has been found that the markers may be used on curved surfaces. It has been found that the markers can be used on a convex curved surface or a concave curved surface.

Application of a marker to a curved surface, in particular a convexly curved surface will impose a degree of stretching on the substrate and the coating or ink. In one embodiment the coating or ink is able to stretch sufficiently that the coating does not crack in use. In a preferred embodiment the coating or ink is able to stretch such that the photoluminescent material on a substrate can be rolled up prior to installation without the coating or ink cracking. It will further be appreciated that a degree of stretching is advantageous in that the coating or ink may be used on a photoluminescent marker that may stretch or compress in use in an aircraft as aircraft expand and contract in length depending on cabin pressurization. It is therefore necessary to allow for the expansion and contraction of a floor area of an aircraft during use and for the variation in the course of a flight. A particular advantage of an emergency lighting system manufactured in accordance with the embodiments disclosed herein is that the resulting marker system is able to expand and contract without cracking or causing damage to the coating. Longer lengths of marker may therefore be used compared to 2 m length markers that have previously been used. It will be appreciated that if the markers used have a longer length or are continuous or semi-continuous than there will be fewer joints to be formed in a guidance path.

In some embodiments the ink or coating is applied to a flexible substrate. The photoluminescent marker may be stored in a roll prior to installation. The photoluminescent marker system may be arranged to comprise at least one photoluminescent marker in accordance with the embodiments disclosed herein. The photoluminescent marker may comprise a flexible photoluminescent marker that may be applied to and mounted on a curved surface in use. In another embodiment, the photoluminescent marker may comprise a rolled photoluminescent marker that is readily installed in an aircraft by unrolling the photoluminescent marker and cutting the marker to length. In some embodiments the photoluminescent marker is provided in a housing. In a preferred embodiment the housing 20 is also flexible. In other embodiments the housing 20 is rigid or semi-rigid. It will be appreciated that in other embodiments the photoluminescent marker is flexible and the housing 20 is relatively more rigid. In some embodiments the housing 20 may be semi rigid or rigid. It has been found that the use of one piece inserts of photoluminescent marker for an emergency lighting system in an aisle of the aircraft cabin reduces the installation time significantly. The preparation time may be reduced by 80% of the allotted time for preparing for installation of the photoluminescent marker system.

Photoluminescent markers may be applied to a curved surface in the aircraft, particularly for markers utilized for identification of the exit doors or other parts of the aircraft.

It has been found that the coating or ink is more durable than conventional coatings or inks used in screen printing applications and solvent based digital printing. It is noted that screen printing is time consuming to set up and requires careful drying of the printed markings. It is also noted that screen printed markings are vulnerable to cracking and fading in use. Additionally digitally printed solvent markings are not durable on certain substrates and may be wiped or removed or damaged in the course of normal use.

Advantageously the coatings or inks used in the embodiments disclosed herein are resistant to abrasive forces. The coatings or inks are adapted to be used in environments where the marker may be handled or touched in the course of normal use. The coating or ink may have a gloss finish or a matte finish. In some embodiments the coating or ink may have an anti-glare finish.

According to another exemplary embodiment, a method of installing at least one photoluminescent marker in an aircraft to provide an emergency lighting system includes providing photoluminescent markers and installing at least an emergency path route marker along both sides of the aisle of an aircraft. It is particularly advantageous to utilize a roll of flexible photoluminescent markers which can be readily unrolled along the aisle, cut to length and installed in place. It is preferred to have a flexible housing.

Figure 3:
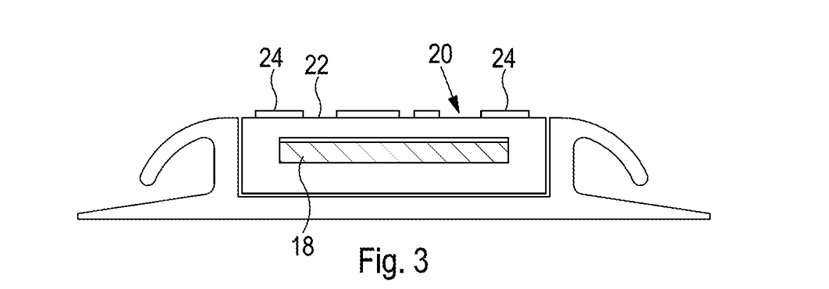
FIG. 3 is a perspective view of a housing with a coating in accordance with an exemplary embodiment.

An emergency lighting system is also provided comprising at least one photoluminescent marker, each photoluminescent marker comprising a housing 20 and an insert 18, the housing 20 being adapted to cover the insert 18, the insert 18 comprising photoluminescent material arranged to be charged through an upper portion 22 of the housing 20 covering the insert and the housing further comprising an external coating wherein the coating comprises a UV curable coating printed on the housing.

The housing 20 can comprise a polycarbonate. In other embodiment the housing may be formed from thermoplastic urethane (TPU), an acrylic or a glass or other suitable material. The housing may have a protective coating on which it is difficult to print.

A UV cured coating 24 is provided on an external surface of the housing. In this embodiment the coating is patterned. The coating may be selected to have a gloss finish or may have a matt or semi-matte finish. It is also possible to provide the coating with an antiglare finish. The coating can also be colored or at least partially colored. The external coating may be a plain coating or a patterned coating. The external coating can be provided with logos or repeating patterns or with branding on the external surface of the housing.

In some embodiments a pattern may be applied to a base of the housing to assist cutting of the housing in installation in an aircraft. Additionally part numbers and batch numbers can be applied to a base of the housing.

In some embodiments the coating of UV cured ink or coating may be applied to provide a protective finish over the housing and the photoluminescent material. The coating may be colored. Use of a colored protective coating allows a color to be applied from one longitudinally extending edge of the marker to an opposed longitudinally extending edge. A uniform color can be achieved across the marker. This is in contrast to the appearance of prior art products in which the typically the housing was not colored and so there is a colored appearance of the photoluminescent strip bounded by clear edges. Provision of edge to edge color enhances the appearance of the marker and can help to camouflage the marker until it is needed in the case of an emergency.

The protective finish may be arranged to provide resistance to chemicals or to abrasion. Resistance to abrasion may provide additional protection in use as a floor marker where the marker is exposed to footfall and the passage of food and drink trolleys.

Use of UV cured coating has been found to allow the provision of different finishes in contrast to previous methods in which any protective coating had to be sprayed onto the housing.

The skilled person will appreciate that the photoluminescent markers must meet the requirements of DO—160 for environmental requirements; CS25.812 with regard to photoluminescent signage and AC25.812 for Photoluminescent floor path marking. Appropriate standards also should be met for recycling and waste requirements such as ISO 14001 relating to Environmental management.

What is claimed is:

1. A method of manufacturing an aircraft photoluminescent marker for use within an aircraft cabin, the aircraft photoluminescent marker comprising a photoluminescent material and a housing arranged to protect the photoluminescent material, the method comprising:
   providing an ink or coating adapted to be cured with ultra violet (UV) radiation;
   printing one or more markings directly onto the photoluminescent material of the photoluminescent marker using the ink or coating; and
   curing the markings made of the ink or coating with UV radiation;
   wherein the marking comprises at least one of a pattern, wording, images, or indicia.

2. The method of claim 1, wherein the UV radiation is emitted by LEDs (light emitting diodes).

3. The method of claim 1, wherein the photoluminescent material is applied to a substrate, and wherein the substrate wherein the substrate comprises a flexible substrate.

4. The method of claim 3, wherein the substrate is roll fed to a printer.

5. The method of claim 1, wherein the photoluminescent material comprises photoluminescent particles dispersed in a resin.

6. The method of claim 1, wherein the photoluminescent material is applied to a substrate, and wherein the substrate comprises a rigid substrate.

7. The method of claim 1, wherein the photoluminescent material is applied to a substrate, and wherein the substrate comprises a curved surface.

8. The method of claim 1, wherein the coating or ink comprises an optically clear acrylic resin.

9. The method of claim 1, wherein the coating or ink is stretchable.

10. An aircraft photoluminescent marker manufactured in accordance with claim 1.

11. An aircraft emergency lighting system comprising one or more photoluminescent markers in accordance claim 1.

12. An aircraft photoluminescent marker for use within an aircraft cabin, the photoluminescent marker comprising a photoluminescent material, a housing arranged to protect the photoluminescent material, and a layer comprising an ink or coating marking printed directly onto the photoluminescent material, the ink or coating which forms the marking being a composition cured by UV radiation and the marking comprising at least one of a pattern, words, images, or indicia.

13. The aircraft photoluminescent marker of claim 12, wherein the photoluminescent material is applied to a substrate, and wherein the substrate is flexible.

14. The aircraft photoluminescent marker of claim 12, wherein the cured ink or coating is flexible and/or stretchable.

15. The aircraft photoluminescent marker of claim 12, wherein the photoluminescent material is applied to a substrate, and wherein the substrate is rigid.

16. The aircraft photoluminescent marker of claim 12, wherein the photoluminescent material is applied to a substrate, and wherein the substrate is curved.

* * * * *